United States Patent [19]

Mackenzie

[11] 4,135,739
[45] Jan. 23, 1979

[54] OFF-SET WELDING RING
[75] Inventor: Kenneth J. Mackenzie, Paris, Tex.
[73] Assignee: The Babcock & Wilcox Company, New York, N.Y.
[21] Appl. No.: 881,975
[22] Filed: Feb. 27, 1978
[51] Int. Cl.² ............................................. F16L 13/02
[52] U.S. Cl. ...................................... 285/22; 228/50; 285/177; 285/286
[58] Field of Search ................... 285/22, 21, 286, 329, 285/173, 177; 228/50

[56] References Cited
U.S. PATENT DOCUMENTS

| 2,125,324 | 8/1938 | Williams et al. | 285/286 X |
| 2,232,593 | 2/1941 | Diescher | 285/286 |
| 2,731,933 | 1/1956 | Phillips | 285/22 X |
| 2,963,129 | 12/1960 | Eberle | 285/286 X |

FOREIGN PATENT DOCUMENTS

| 166100 | 3/1934 | Switzerland | 285/286 |
| 287005 | 3/1928 | United Kingdom | 285/286 |

*Primary Examiner*—Thomas F. Callaghan
*Attorney, Agent, or Firm*—Joseph M. Maguire; Edward A. Steen

[57] ABSTRACT

An asymmetrical welding ring for facilitating the end to end welding of tubes having unequal inside diameters. The welding ring is provided with an arcuate inner periphery and an irregular outer periphery divided into three distinct frustoconical surfaces.

4 Claims, 3 Drawing Figures

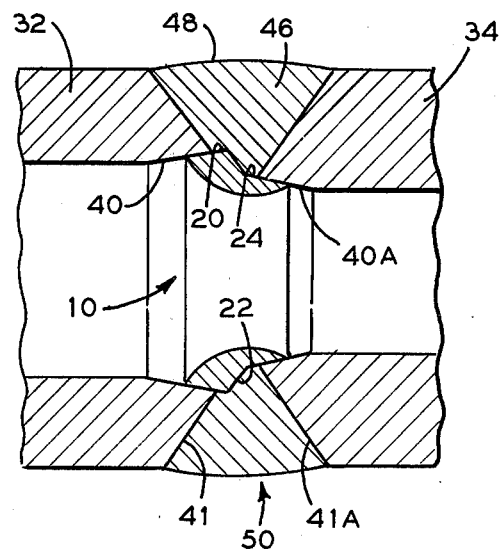
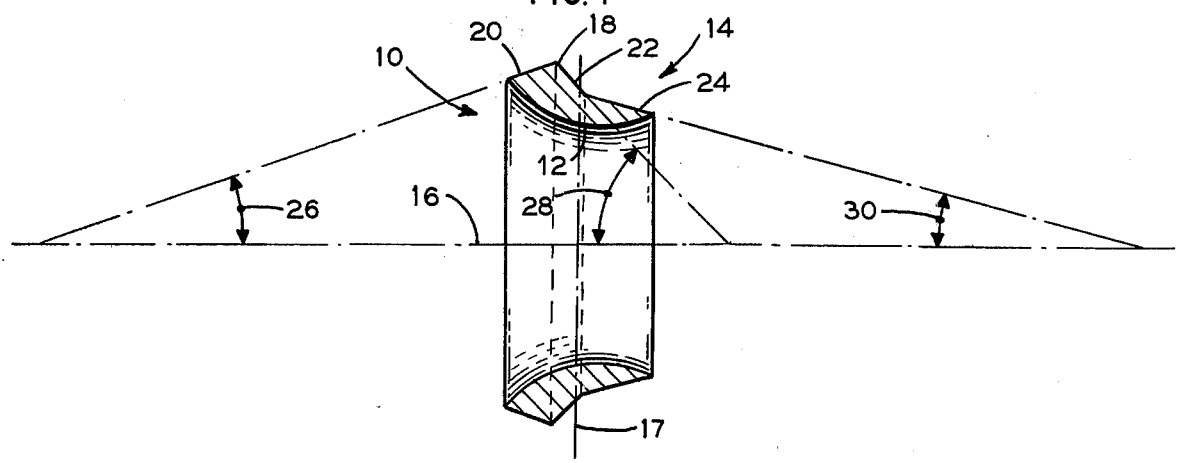
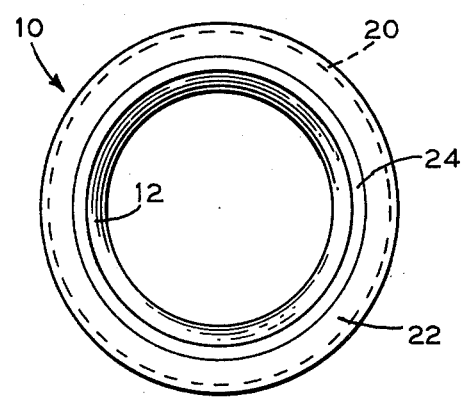

OFF-SET WELDING RING

BACKGROUND OF THE INVENTION

1. Field of the Invention

This invention relates to the art of welding dissimilar tubes end to end and more specifically to a welding ring designed to effect that desired union.

2. Description of the Prior Art

The present practice of end joining tubes or pipes composed of dissimilar grades or compositions and having unequal inside diameters is both time consuming and expensive.

When it is necessary to weld a higher grade tube having a thinner wall end to end to a lower grade tube having a thicker wall, various involved fabricating steps must be carefully followed in order to prepare the ends of the two tubes for the reception of a welding ring.

It should be noted that if high temperature and/or high pressure service requirements are contemplated for the welded tubes, it may be unsafe to machine the lower grade tube to any great extent. To do so, is to court possible tube failure.

The involved prior practice requires the following steps: first, the higher grade tube must be internally upset. To accomplish this, a tube end is heated to a sufficiently softened state. The hot tube end is then placed in a die of the desired contour whereupon axial pressure is applied to the tube. After the tube has assumed the proper shape, it is allowed to cool. Finally, the tube is heat treated to remove any residual stresses.

The second step entails boring the internal upset end of the higher grade tube to conform its inner periphery to that of the lower grade tube. The upset is machined to an appropriate taper to effect a properly aligned seating surface for a symmetrical welding ring to be inserted between the two tubes. A similar taper is provided on the lower grade tube end. In addition, a weld groove is machined along the end faces of both tubes to provide a circumferential notch for subsequently deposited weld beads.

The third step involves inserting the symmetrical welding ring between the two tapered end surfaces whereupon weld beads are then deposited about the joint in the usual manner.

SUMMARY OF THE INVENTION

The use of the present invention totally eliminates the need for internally upsetting the higher grade tube. By employing the disclosed welding ring, a secure weld may be effected while simultaneously simplifying the procedure involved in preparing the receiving surfaces of the tube ends for a welding ring.

In the preferred embodiment of the invention, there is provided an annular asymmetrical welding ring having an arcuate inner periphery. Its irregular outer periphery is divided into three distinct frusto-conical surfaces wherein each surface intersects the next successive surface. In addition, the first and third surfaces both intersect the inner periphery.

The welding ring is inserted into matched receiving surfaces of the two tube ends whereupon weld beads are deposited along the periphery of the joint.

BRIEF DESCRIPTION OF THE DRAWING

FIG. 1 is a cross section of the welding ring embodying the invention;

FIG. 2 is an end view of the welding ring;

FIG. 3 is a cross section of the welding ring inserted and welded between two dissimilar tubes.

DESCRIPTION OF THE PREFERRED EMBODIMENTS OF THE INVENTION

FIGS. 1 and 2 show an asymmetrical offset welding ring. The ring 10 has an arcuate inner periphery 12 and an irregular asymmetrical z-shaped outer circumferential periphery 14. The outer periphery 14 is formed by first frusto-conical surface 20, second frusto-conical surface 22 and third frusto-conical surface 24. It will be noted that the first surface 20 and the second surface 22 intersect at the maximum diameter 18 of the welding ring 10. Reference line 16 represents the axis of symmetry of the ring 10. Central reference line 17, disposed normally to line 16, represents the axis of asymmetry of the ring 10.

The inclination of the frusto-conical surfaces 20, 22 and 24 respectively need not be fixed relative to each other. Rather, any combination of inclinations may be satisfactorily employed as long as they do not compromise the integrity of the joint to be welded between the tubes 32 and 34. See FIG. 3.

It has been determined, however, that a fairly limited range of inclinations are most expedient.

The angles 26 and 30 formed by the first and third surfaces 20 and 24 with respect to the axis of symmetry 16 should be in a range from about 5° to about 15°. Any angle appreciably greater than 15° would shorten the width of the weld ring 10 and cause difficulties in positioning it properly. An angle smaller than 5° would increase the length of machining required. This, obviously, would require a proportionally undesirable increase in machining time. It should be recognized that angles 26 and 30 need not be equal.

The angle 28 formed by the second surface 22 with respect to the axis of symmetry 16 should be in a range from about 45° degrees to about 65° An angle greater than 65 degrees would create problems for the welding technician, since it would limit the access space necessary for the proper insertion of a welding tool. An angle smaller than 45° would increase the size of the weld and as a consequence, the amount of welding material required to effect a secure weld.

The principles underlying the invention and the manner of applying it may, perhaps, be better understood by a brief discussion of an envisioned use of the invention.

It is often necessary to weld two tubes of equal outside diameter having dissimilar grades or compositions and unequal inside diameters. FIG. 3 represents this situation. Of course, the welding ring 10 may be employed in instances where the dissimilar tubes 32 and 34 are composed of the same material or when the tubes are of unequal outside diameter.

Assume that the higher grade tube 32, having a larger inside diameter, is to be welded end to end to the lower grade tube 34, having a smaller inside diameter. As was already discussed, it may be unwise to substantially machine the thicker walled tube 34 since it may be composed of a weaker material than the thinner, albeit stronger, tube 32.

The former practice of joining such dissimilar tubes is briefly discussed. Prior to weld-joining the abutting ends of tubes 32 and 34 together, the abutting end of the tube 32 would be internally upset and bored to conform to the inner periphery of tube 34. Reference should be made to the Background of the Invention section. Both the upset end of the tube 32 and the end of the tube 34 would be then machined to form an internal tapered weld ring receiving surface. As the two tubes were brought together, a symmetrical welding ring would be inserted between them. Finally, the requisite number of weld beads would be then deposited within a weld groove formed by the ends of the two tubes.

FIG. 3 shows a relationship between the welding ring 10, joint 48 and the two tubes 32 and 34. It is evident that there are several advantages to the disclosed invention. The most obvious advantage is that the involved step of internally upsetting the higher grade tube has been dispensed with. As a consequence, the subsequent requirement of boring the internal upset has been eliminated as well. Furthermore, the flow characteristics of the joint are improved with the removal of the abrupt internal shoulder formed by the upset.

It is quite evident, from viewing FIG. 3, that the tube end inner surfaces 40 and 40A of the tubes 32 and 34 respectively will always be machined at the same angle as the corresponding first and third frusto-conical surfaces 20 and 24 disposed contiguous with them. In addition, the tube end faces 41 and 41A are tapered to form weld groove 50. Furthermore, the first surface 20 communicates with both the thinner tube 32 and the weld deposit 46 whereas surface 24 communicates with both the thicker tube 34 and the weld deposit 46. It is contemplated that surface 22 will communicate with the weld deposit 46 only.

Furthermore, it is contemplated that for most applications, the welding ring will be composed of the same material as the higher grade tube.

While in accordance with provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. In combination with tubes of unequal inside diameter to be weld-united end to end, an asymmetrical welding ring disposed therebetween comprising an arcuate inner periphery and an irregular outer periphery, the outer periphery formed of first, second and third frusto-conical surfaces, each surface intersecting the next successive surface and the first and third surfaces intersecting the inner periphery, the first and third surfaces forming angles with respect to the axis of symmetry of the ring from about five degrees to about fifteen degrees, the second surface forming an angle with respect to the axis of symmetry from about 45° to about 65°, the first and second surfaces intersecting at the maximum diameter of the ring, and the first and third surfaces being at least partially contiguous with the inner periphery of the tube ends.

2. The combination according to claim 1 wherein one of the weld-united tubes is of higher grade material than the other.

3. The combination according to claim 2 wherein the tube of higher grade material has the greater inside diameter.

4. The combination according to claim 2 wherein the welding ring is composed of the higher grade material.

* * * * *